(12) United States Patent
Van Wyngarden

(10) Patent No.: US 7,389,331 B2
(45) Date of Patent: *Jun. 17, 2008

(54) METHOD AND SYSTEM FOR RECEIVING AND PROVIDING ACCESS TO INFORMATION AT A WEB SITE

(75) Inventor: Amy Van Wyngarden, Austin, TX (US)

(73) Assignee: Dell USA L.P., Round Rock, TX (US)

( * ) Notice: Subject to any disclaimer, the term of this patent is extended or adjusted under 35 U.S.C. 154(b) by 251 days.

This patent is subject to a terminal disclaimer.

(21) Appl. No.: 11/086,935

(22) Filed: Mar. 22, 2005

(65) Prior Publication Data

US 2005/0165660 A1    Jul. 28, 2005

Related U.S. Application Data

(63) Continuation of application No. 10/649,579, filed on Aug. 26, 2003, now Pat. No. 6,883,022, which is a continuation of application No. 09/488,936, filed on Jan. 21, 2000, now Pat. No. 6,694,365, which is a continuation of application No. 09/009,401, filed on Jan. 20, 1998, now Pat. No. 6,038,597.

(51) Int. Cl.
*G06F 13/00* (2006.01)

(52) U.S. Cl. .......................... 709/219; 709/225; 705/26

(58) Field of Classification Search ............... 709/217, 709/219, 223, 225; 713/201; 705/25, 26
See application file for complete search history.

(56) References Cited

U.S. PATENT DOCUMENTS 4,751,669 A    6/1988    Sturgis et al.

(Continued)

FOREIGN PATENT DOCUMENTS

EP    0 778 512    6/1997

(Continued)

OTHER PUBLICATIONS

SignPost... Directing Traffic To Your Site! Step 4 on the route to web success!; http://www.signpost.ca/step4.html, printed Mar. 2003.

(Continued)

*Primary Examiner*—Viet D. Vu
(74) *Attorney, Agent, or Firm*—Haynes and Boone, LLP

(57) ABSTRACT

At a vendor-managed web site, purchasing information is received from a first terminal, including purchasing information that is customized for a customer. The customer includes first and second users having respective first and second levels of authorized access to the purchasing information. The first user is identified by a first identifier, and the second user is identified by a second identifier. To a second terminal, access at the vendor-managed web site is provided to: only a first portion of the purchasing information in response to receiving the first identifier from the second terminal which identifies the first user; and at least a second portion of the purchasing information in response to receiving the second identifier from the second terminal which identifies the second user. The second portion includes at least a part of the first portion and a third portion of the purchasing information. The part of the first portion includes at least a portion of the customized purchasing information.

37 Claims, 4 Drawing Sheets

U.S. PATENT DOCUMENTS

| | | | |
|---|---|---|---|
| 4,815,030 A | | 3/1989 | Cross et al. |
| 5,113,499 A | | 5/1992 | Ankney et al. |
| 5,230,048 A | | 7/1993 | Moy |
| 5,315,508 A | * | 5/1994 | Bain et al. ............... 705/28 |
| 5,323,315 A | * | 6/1994 | Highbloom ............... 705/38 |
| 5,416,842 A | | 5/1995 | Aziz |
| 5,455,953 A | | 10/1995 | Russell |
| 5,553,239 A | | 9/1996 | Heath et al. |
| 5,598,536 A | | 1/1997 | Slaughter, III et al. |
| 5,606,668 A | | 2/1997 | Shwed |
| 5,608,900 A | | 3/1997 | Dockter et al. |
| 5,678,041 A | | 10/1997 | Baker et al. |
| 5,708,780 A | | 1/1998 | Levergood et al. |
| 5,710,887 A | | 1/1998 | Chelliah et al. |
| 5,712,979 A | | 1/1998 | Graber et al. |
| 5,721,908 A | | 2/1998 | Lagarde et al. |
| 5,751,956 A | | 5/1998 | Kirsch |
| 5,751,961 A | | 5/1998 | Smyk |
| 5,758,126 A | * | 5/1998 | Daniels et al. ............ 715/780 |
| 5,761,683 A | | 6/1998 | Logan et al. |
| 5,802,299 A | | 9/1998 | Logan et al. |
| 5,812,769 A | | 9/1998 | Graber et al. |
| 5,812,776 A | | 9/1998 | Gifford |
| 5,819,285 A | | 10/1998 | Damico et al. |
| 5,822,518 A | | 10/1998 | Ooki et al. |
| 5,881,225 A | * | 3/1999 | Worth ..................... 726/17 |
| 5,903,732 A | * | 5/1999 | Reed et al. ............... 709/229 |
| 5,970,472 A | | 10/1999 | Allsop et al. |
| 5,991,543 A | | 11/1999 | Amberg et al. |
| 5,995,757 A | | 11/1999 | Amberg et al. |
| 6,003,047 A | * | 12/1999 | Osmond et al. ........... 715/513 |
| 6,014,666 A | * | 1/2000 | Helland et al. ............ 707/9 |
| 6,026,433 A | | 2/2000 | D'Arlach et al. |
| 6,058,373 A | * | 5/2000 | Blinn et al. ............... 705/26 |
| 6,061,057 A | | 5/2000 | Knowlton et al. |
| 6,064,977 A | | 5/2000 | Haverstock et al. |
| 6,073,124 A | * | 6/2000 | Krishnan et al. .......... 705/59 |
| 6,081,829 A | | 6/2000 | Sidana |
| 6,115,040 A | | 9/2000 | Bladow et al. |
| 6,125,352 A | | 9/2000 | Franklin et al. |
| 6,393,462 B1 | | 5/2002 | Mullen-Schultz |
| 7,287,271 B1 | * | 10/2007 | Riggins ................... 726/3 |

FOREIGN PATENT DOCUMENTS

| | | |
|---|---|---|
| EP | 0 848 314 | 6/1998 |
| EP | 0 860 763 | 8/1998 |
| EP | 0 863 453 | 8/1998 |
| WO | 97/11429 | 3/1997 |
| WO | 97/13330 | 4/1997 |
| WO | WO98/03923 | 1/1998 |

OTHER PUBLICATIONS

Robots Mailing List Archive: Re: Crawling & DNS Issues; http://www.robotstxt.org/wc/mailing-list/2026.html, printed Mar. 2003.
ANZCA—Web Links—Suggest a Link; http://www.anzca.edu.au/infocentres/weblinks/link.htm, printed Mar. 2003.
Big Bang Business Plan Competition. Calendar; http://bigbang.gsm.ucdavis.edu/.%5Cnews%5Cnews.html, printed Mar. 2003.
Linkage; Links+Linking; http://littlerowboat.net/piano/links/, printed Mar. 2003.
Interscan Corporation—Monitor Newsletter vol. 3, No. 1; http://www.gasdetection.com/NEWS/V3N1.html, printed Mar. 2003.
Ecommerce and Web Strategies; The Gadwall Group; http://www.gadwall.com/internet/ecommerceandweb.html, printed Mar. 2003.
Internal Rate of Return Revisited; http//members.tripod.com\~Ray_Martin/DCF/nr7aa003.html, printed Mar. 2003.
OrderMate.com by Plateau; http://www.plateauzone.com/index.cfm?page=prod_omsec, printed Mar. 2003.
Rental Housing Professional Search; http://rhol.org/url/urlsearch2.asp, printed Mar. 2003.
Buddhist Philosophy on the Web; http://personal.wofford.edu/~kellerja/budweb.htm, printed Mar. 2003.
Redirecting Your Home Page; http://www.art.net/Help/redirecting.html, printed Mar. 2003.
Misnamed URL?; http://www.mhhe.com/physsci/physical/moore/messages/17.html, printed Mar. 2003.
Secure Computing; Protecting the World's Most Important Networks; http://www.securecomputing.com/index.cfm?sKey=275, printed Mar. 2003.
Interactive Advertising Bureau Jargon Buster Traffic; http://www.interactivejaronguide.org/Glossary/Term/Traffic, printed Mar. 2003.
Public Policy 195.26—Child Development for Public Policy: http://www.pubpol.duke.edu/centers/child/syl-lansford-F02.html, printed Mar. 2003.
Using the Internet—lumenweb; http://www.lumen.wa.edu.au/lumenweb2.html, printed Mar. 2003.
ArkySoft LLC—Mail Harvester Enterprise—Filters Tab; http://www.arkysoft.com/mh_ent_tutorials/mh_enterprise_filters_tab.asp, printed Mar. 2003.
Step aside please Google : evolt.org.News; http://www.evolt.org/article/Step_aside_please_Google/1/23289/?format=print, printed Mar. 2003.
Changing the URL of a site; http://www.webmasterworld.com/forum17/997.htm, printed Mar. 2003.
"The Consortium of the State of Tennessee"; Request for Proposals 00-1 Bid #719; Dell Bid No. 299110190TS; Dec. 20, 1999.
Original Complaint For Patent Infringement And Demand For Jury Trial, *Dell USA L.P.* v. *Lucent Technologies, Inc.*, Civil Action No. 4:03cv347, filed Sep. 12, 2003.
Defendant Lucent Technologies, Inc.'s Answer and Counterclaims, *Dell USA L.P.* v. *Lucent Technologies, Inc.*, Civil Action No. 4:03cv347, filed Oct. 20, 2003.
Plaintiff's Answer to Defendant's Counterclaim, *Dell USA L.P.* v. *Lucent Technologies, Inc.*, Civil Action No. 4:03cv347, Dec. 2003.
Ferraiolo, David and Barkley, John; "Specifying and Managing Role-Based Access Control Within a Corporate Intranet", 1997, pp. 77-82, National Institute of Standards and Technology.
Prakash, S., "Extending The Corporate Intranet", 1997, pp. 21-26, IEEE.
Goldmann, Nahum, "Extranet: The Third Wave in the Internet Electronic Commerce", Jan. 1997, http://www.arraydev.com.
Perez, Juan Carlos, Heineken's HOPS Software Keeps A-Head on Inventory: Extranet Puts Sales Channel Data On Tap, Jan. 13, 1997, vol. 14, No. 2, PC Week, Ziff-Davis Publishing Company.
Frontier Software: WebCast Delivers Web Access To End-To-End Network Traffic Reports, Troubleshooting, Jan. 20, 1997, M2 Presswire.
Vacca, John R., "Intranet Security:Managing Intranet Security from Mobile and Remote Sites", 1997, Chapter 15, pp. 339-346, Charles River Media, Inc., Rockland Massachusetts.
Tari, Zahir and Chan, Shun-Wu, "A Role-Based Access Control For Intranet Security", Sep.-Oct. 1997, pp. 24-34, IEEE Internet Computing.
Elliott, Christopher, "Everything Wired Must Converge", Nov. 19, 1997, Journal of Business Strategy.
"FedEx Standardizes on Netscape Software for Internet and Intranet: Using Netscape Software for FedEx Intranet to Serve Corporate Needs", Jun. 11, 1996, Financial News.
"Enrollment Begins Today for ZD Net University on the Web, High-Tech Continuing Education Courses for Busy Professionals", Sep. 30, 1996, PR Newswire.
Tebbe, Mark, "Extranets Grow As Companies Link Intranets To Partners", Oct. 30, 1996, vol. 8, No. 22, Electronic Messaging News.
"Internet Solutions Promise Outsourcing Opportunities". Nov. 6, 1996, vol. 13, No. 23, Financial Services Report.
"Extranets Intelligently Link Intranets", Nov. 11, 1996, vol. 158, No. 45, PC Week, Ziff-Davis Publishing Company.
"ZD Net Launches ZD Net News, Breaks the Mold of News-Oriented Web Sites", Nov. 19, 1996, PR Newswire, Ziff-Davis Publishing Company.
"World Star Holdings, Ltd. To Provide Online Security for CoreStates Bank", Nov. 21, 1996, Financial News. PR Newswire.

Devoe, Deborah, "Case Study: Trailblazer-Heineken USA; Brewer HOPS Onto 'Net for Planning", Dec. 23, 1996, p. 15, Top of the News, InfoWorld.

Lange, Larry, "Engineering's Next Net Wave: Extranet", Dec. 23, 1996, Electronic Engineering Times.

Helmstetter, Greg, "Increasing Hits and Selling More on Your Web Site", 1997, pp. 1-374, John-Wiley & Sons, Inc., USA.

Dion, Denis, Jr., Escobar, Antoine, Tremblay, Jacques, Laurendeau, Denis, "Development of Educational Tools: A Web-Oriented Approach", 1997, Frontiers in Education Conference, pp. 842-847, IEEE.

"PR Newswire Available on Ziff-Davis Interactive's 'ZD Net Personal View", Oct. 11, 1995, PR Newswire.

Sterne, Jim, "Customer Service on the Internet: Building Relationships Increasing Loyalty and Staying Competitive", 1996, pp. 1-317, John Wiley & Sons, Inc., USA.

Horton, William Taylor, Lee; Ignacio, Arthur; Hoft, Nancy L., "The Web Page Design Cookbook", 1996, pp. 1-649, John Wiley & Sons, Inc., USA.

Manning, Ric, "Manning the Wires: Small-Town Kentucky Bankers Beat the Big Guys to the Web", Jan. 1996, pp. 120-121, Boardwatch.

Tinoco, Lucio Cunha, Thesis: Online Evaluation in WWW-Based Courseware: The QUIZIT System, Jan. 20, 1996, pp. 1-81.

Manning, Ric, "Manning the Wires: Investment Firms Cash in on the Web", Feb. 1996, p. 120, Boardwatch.

Sandhu, Ravi S.; Coyne, Edward J.; Feinstein, Hal L., Youman, Charles E., "Role-Based Access Control Models", Feb. 1996, pp. 38-47, IEEE.

Creech, Michael, "Author-Oriented Link Management", Mar. 1996, pp. 1-16, Hewlett-Packard Company.

Press, Larry, "Windows NT as a Personal or Intranet Server", May 1996, vol. 39, No. 5, pp. 19-23, Communications of the ACM.

Lee, Chooi-Tian; Harris, J.W., "Designing a Virtual Access Control Configuration Protocol for Implementation Over ISDN and Shared-Media Networks", May 1996, pp. 116-125, IEEE.

Duan, Nick N., "Distributed Database Access in a Corporate Environment Using Java", May 1996, Fifth International World Wide Web Conference, Paris, France.

Kahan, Jose, "A Capability-Based Authorization Model for the World Wide Web", pp. 1-11, undated.

Kasten, Eric, "Access Information Through World Wide Web: Installing CERN's WWW Server", pp. 1-6, undated.

Abowd, Gregory D.; Pitkow, James E. (College of Computing, Georgia Institute of Technology); Kazman, Rick (Department of Computer Science, University of Waterloo), Analyzing Differences Between Internet Information System Software Architectures, pp. 1-15, undated.

Rao, Herman C.; Peterson, Larry L., "Accessing Files in an Internet: The Jade File System", Jun. 1993, pp. 613-624, vol. 19, No. 6, IEEE Transactions On Software Engineering.

Berners-Lee, Tim, "Uniform Resource Locators: Generated from the Hypertext", Mar. 1994, pp. 1-14.

Net.Genesis and Hall, Devra, "Build a Web Site: The Programmer's Guide to Creating, Building, and Maintaining a Web Presence", pp. 1-701, Prima Publishing, Rocklin, California., 1995.

Stempel, Steffen, "IpAccess-An Internet Service Access System for Firewall Installations", Apr. 1995, pp. 31-41, IEEE.

Tuohey, Sam, "Stanford Federal Credit Union Pioneers Online Financial Services", Jun. 21, 1995, Business Wire.

Portsmouth, Ian, "Strange New World", Oct. 1995, p. 34, Profit.

Sprout, Allison L.; Coxeter, Ruth M., "The Internet Inside Your Company: New Computer Networks Called Internal Webs Make It Easy For Employees At Companies Like Us West, Morgan Stanley, and Turner Broadcasting To Share Information And Collaborate On Projects. Best Of All. The Technology's Cheap And It's Safe", Nov. 27, 1995, p. 161, Information Technology Section, Fortune.

Papalia, Martha, "Ziff-Davis Interactive Announces First Free Personalized News Service On The World Wide Web; ZD Net Personal View Provides Customizable Snapshot of Computing News From Leading Information Sources", Oct. 10, 1995, Business Wire.

Baentsch, Michael; Baum, Lothar; Molter, Georg; Rothkugel, Steffen; Sturm, Peter, "Enhancing the Web's Infrastructure-From Catching to Replication", pp. 1-8, Systemsoftware Research Group, CS Department, University of Kaiserslautern, Kaiserslautern, Germany, undated.

Baker, Brenda S.; Grosse, Eric, "Local Control Over Filtered WWW Access", pp. 1-9, undated.

Expert Report of Susan Spielman Concerning U.S. Appl. No. 6,038,597 including Exhibits A-J, *Dell USA L.P. vs. Lucent Technologies, Inc.*, Civil Action No.: 4:03CV347, May 3, 2007.

Rebuttal Export Report of Dr. Dean Noble, *Dell USA L.P. vs. Lucent Technologies, Inc.*, Civil Action No.: 4:03CV347, Sep. 7, 2007.

\* cited by examiner

| NAME | ADDRESS | PHONE | FAX | E-MAIL | TITLE | SUPPORT CATAGORY |
|---|---|---|---|---|---|---|
| MEMBER 1 | | | | | ACCOUNT EXECUTIVE | SALES |
| MEMBER 2 | | | | | CUSTOMER SERVICE EXECUTIVE | CUSTOMER SERVICE |
| MEMBER 3 | | | | | | |
| MEMBER 4 | | | | | | |
| MEMBER 5 | | | | | | |
| MEMBER 6 | | | | | | |
| MEMBER 7 | | | | | | |

Fig. 3

METHOD AND SYSTEM FOR RECEIVING AND PROVIDING ACCESS TO INFORMATION AT A WEB SITE

CROSS-REFERENCE TO RELATED APPLICATIONS

This application claims priority to and is a continuation of co-owned co-pending U.S. patent application Ser. No. 10/649,579, filed Aug. 26, 2003, by Amy Van Wyngarden, entitled METHOD AND SYSTEM FOR RECEIVING AND PROVIDING ACCESS TO INFORMATION AT A WEB SITE, now U.S. Pat. No. 6,883,022, which is a continuation of co-owned U.S. Pat. No. 6,694,365, issued on Feb. 17, 2004, entitled METHOD AND SYSTEM FOR RECEIVING AND PROVIDING ACCESS TO INFORMATION AT A WEB SITE which is a continuation of co-owned U.S. application Ser. No.09/009,401, filed Jan.20, 1998, now U.S. Pat. No. 6,038,597, issued on Mar. 14,2000, entitled METHOD AND APPARATUS FOR PROVIDING AND ACCESSING DATA AT AN INTERNET SITE, which are incorporated herein by reference in their entirety.

BACKGROUND

The disclosures herein relate generally to information systems and more particularly to receiving and providing access to information at a web site.

Various systems have been developed whereby data and information can be accessed by a remote provider and a remote user. In one such system, a remote access server provides a remote user with access to a local computer network. The server receives a user identification string from its communication port, the string having been entered by the remote user at a remote computer which is coupled to the communication port. The string identifies the remote user. The server uses the string to access a database and determine an Internet protocol (IP) address associated with the string. The remote computer needs the IP address to communicate on the local computer network. The database includes a user identification string for each remote user and an IP address for each string. The remote access server sends the IP address to the remote computer via the communication port. The server then allows the remote computer to access the local computer network and to communicate on the local computer network using the IP address.

Another system is a multitask multiuser system which provides for efficient transfer of data from a remote data base to individual subscribers and has particular utility in the distribution of stock market data. A primary provider distributes the incoming data directly to user tasks or to an inquiry provider or a monitor provider. The inquiry provider responds to specific inquiries by users for information in the data base. The monitor provider maintains lists of information which are being monitored by the host computer for individual users. The inquiry provider and the monitor provider do not repeat requests to the remote data base where a similar request is already pending from another user. Data transfer paths between tasks are established by a code module which may be linked to any of the tasks. The transfer paths are established using information from a configuration list and they are monitored by the operating system through a wait list established for each user task. Providers in the system may establish subscriber lists through the code module.

In another application, an authorization mechanism provides authorization information for a client requesting access to a server resource in a server, having a directory server for storing client information required by the server in executing an operation call, including client access rights, and generating a request for an authorization ticket to the server. The request for an authorization ticket includes an identification of the client and an identification of the client information required by the server and is in association with an operation call. The authorization mechanism generates an authorization ticket including the identified information encrypted with an encryption key derived from the password of the server. The authorization ticket is sent to the server and the server decrypts the authorization ticket with the server password and obtains the client information directly including the client access rights. Client information is stored in directory server fields identified by generic field tags. The authorization ticket request identifies client information by tag names identifying the fields, the requested information is stored in the authorization ticket in fields identified by the tag names, and the server mechanism then reads the client information.

A further application includes a first data processing device (node I) coupled to a first private network and to a firewall server (FWA). Firewall server FWA is in turn coupled to a public network, such as the Internet. A second data processing device (node J) is coupled to a second private network which is coupled to the Internet through a firewall server (FWB). Node I provides a data packet including IP data and a destination address for the intended receiving node J to firewall FWA. Firewall FWA is provided with a secret value and a public value. The firewall FWA obtains a Diffie-Hellman (DH) certificate for firewall FWB and determines the public value from the DH certificate. A transient key is randomly generated and is used to encrypt the data packet to be transmitted by firewall FWA to firewall FWB. The encrypted data packet is then encapsulated in a transmission packet by the firewall FWA. The transmission packet includes an unencrypted destination address for the firewall FWB. Firewall FWA then sends the transmission packet to firewall FWB over the Internet. Upon receipt of the transmission packet from firewall FWA, firewall FWB obtains a DH certificate for firewall FWA and determines the public value from the DH certificate. Firewall FWB decrypts the encrypted data packet received from FWA, thereby resulting in the recovery of the original data sent by node I in unencrypted form to the firewall FWA. The firewall FWB then transmits the decrypted data packet to the receiving node J over the second private network.

Purchasing is a major component of the operation of a business. It involves establishing authorized vendor sources, seeking first time or unusual vendor sources and maintaining vendor relationships. Typically, as strong relationships build and as quantity buying develops, purchasing power can increase and purchasing costs can decrease. A major part of repetitive purchasing is based on purchasing history, i.e. what has been purchased in the past, what options are desired, and what options are available.

An important aspect of repetitive purchasing is the accessibility of purchasing history. A purchaser can maintain records as well as a vendor but this will most likely only reveal what has been purchased in the past. A customer may need to know about available options for anticipated purchases and a vendor may have modified or new products which are of interest to the customer. This can be accomplished by repeated direct contact between purchasing department personnel and vendor sales and accounting or other personnel. Such contact may be accomplished by numerous telephone calls to several sources at the vendor's site.

Information gathered by the purchaser from the vendor then needs to be communicated by purchasing personnel to the person(s) within the organization who requested the information. Additional phone calls and/or meetings may be required before a decision can be made for a definitive purchase. The purchasing agent must then negotiate the best price based on many factors including the nature of the item and the quantity desired.

Accordingly, a need has arisen to enhance receiving and providing access to information at a web site, in which various shortcomings of previous techniques are overcome.

SUMMARY

According to one embodiment, at a vendor-managed web site, purchasing information is received from a first terminal, including purchasing information that is customized for a customer. The customer includes first and second users having respective first and second levels of authorized access to the purchasing information. The first user is identified by a first identifier, and the second user is identified by a second identifier. To a second terminal, access at the vendor-managed web site is provided to: only a first portion of the purchasing information in response to receiving the first identifier from the second terminal which identifies the first user; and at least a second portion of the purchasing information in response to receiving the second identifier from the second terminal which identifies the second user. The second portion includes at least a part of the first portion and a third portion of the purchasing information. The part of the first portion includes at least a portion of the customized purchasing information.

A principal advantage of this embodiment is that various shortcomings of previous techniques are overcome.

BRIEF DESCRIPTION OF THE DRAWING

FIG. 3 is a diagrammatic view illustrating an embodiment of a team area of the web page.

DETAILED DESCRIPTION

Figure 1:
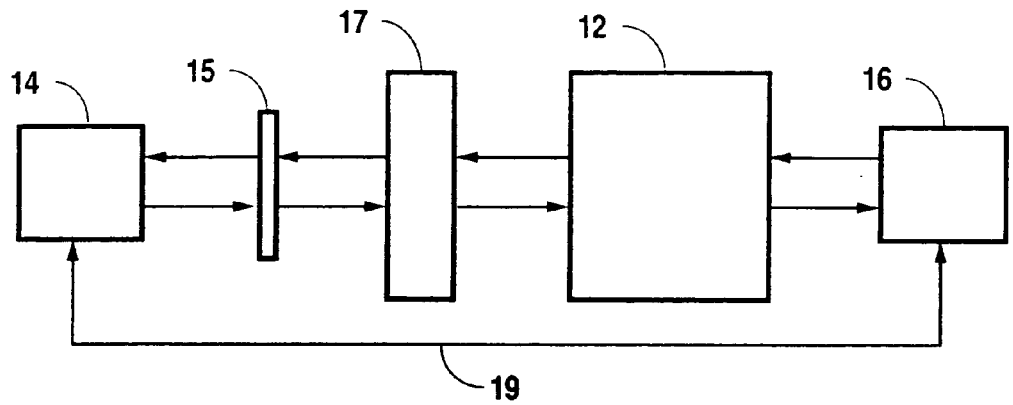
FIG. 1 is a diagrammatic view illustrating an embodiment of a network.

A network 10, FIG. 1 includes a web site 12 having a web page or several pages coupled to a first user point 14 and a second user point 16. The first user point 14 as used in this context is any terminal on a private network used by a site provider to input managed information to the web site 12. The second user point 16 as used in this context is any terminal used by a site user via the Internet to access all or part of the managed information at the web site 12.

The site provider at first user point 14, writes to a series of Internet tools, diagrammatically illustrated at 15, and publishes to an internal copy 17 of the web site 12 for pre-production purposes. Ultimately, the site provider publishes to the web site 12. The site user at second user point 16 has access to web site 12 and can also communicate directly via a link 19 with the site provider at first user point 14 via, for example, e-mail for the purpose of submitting orders for goods offered for sale at the web site 12. Additionally, the site provider directly accesses the web site 12 for maintenance purposes, e.g. to access the web site 12 to monitor traffic to the site and the quality of the site.

Figure 2:
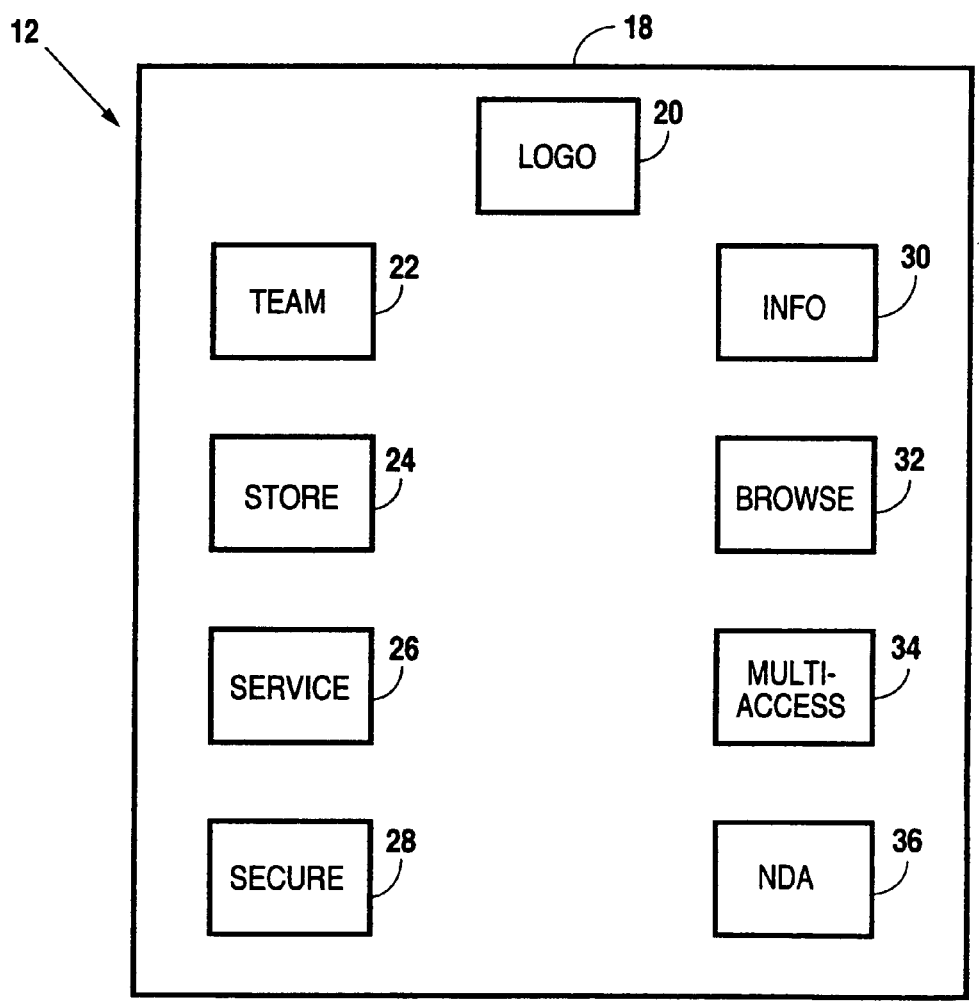
FIG. 2 is a diagrammatic view illustrating an embodiment of a web site.

Web site 12 includes a web page or pages 18, FIG. 2 including customized information to provide customers at second user point 16 with an easier way of doing business with a site provider at first user point 14. Web page 18 resides on the web site 12 behind an unlisted universal resource locator (URL). Users at second user point 16 are provided with user ID's and user passwords for accessing the web page 18.

Web page 18 features a user logo area 20 and a menu bar selection including a provider team area 22, a store area 24, a service and support area 26, a secure area 28, a site information area 30, a browse area 32, a multi-access area 34 and a non-disclosure agreement (NDA) area 36. The web page 18 information listed above in the various areas are maintained current by the site provider by multiple daily updates.

User logo area 20 includes, with the user's permission, a graphical representation of the logo of the user organization. If the user does not have a logo or does not wish for the logo to be used, the user organizations name may be used in text format.

Team area 22, FIG. 3 includes names, addresses, phone and fax numbers, e-mail links and titles of provider team members and a support category into which each team member is classified, e.g. sales, customer service, etc. Data listed in the team area can be changed with add-ons and updates in order to be maintained current. Other information can be provided if desired.

Figure 4:
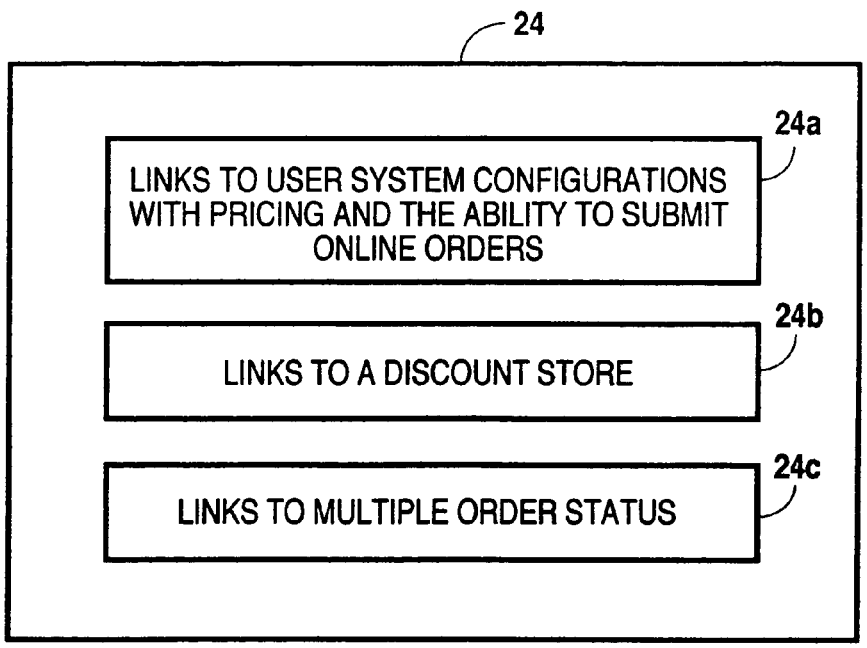
FIG. 4 is a diagrammatic view illustrating an embodiment of a store area of the web page.

Store area 24, FIG. 4 provides links to user standard system configurations 24a including pricing information and the ability to submit online orders; links to a discount store 24b for additional product information; and links to multiple order status 24c which permits the user to view status and shipping details of open orders. It is also possible to receive shipment e-mail notification automatically, if desired so that the user is prompted when an order is shipped. Store information may include a system category, title, a quote member, a price and a list of options. The store information may be modified by the site provider such as by adding a system category, changing a standard configuration, or changing other data included in the store information.

Figure 5:
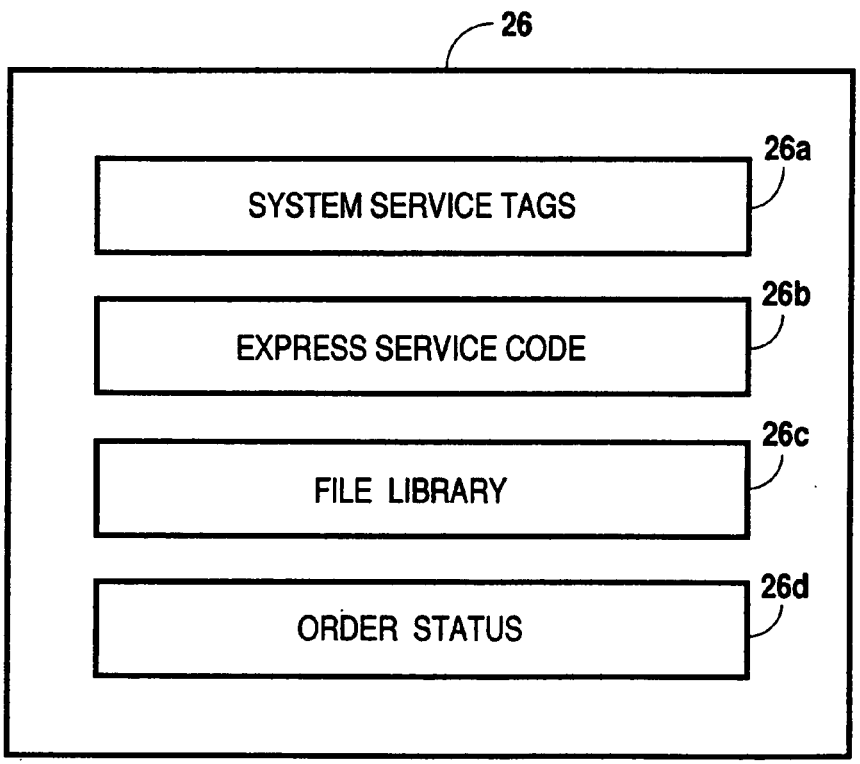
FIG. 5 is diagrammatic view illustrating an embodiment of a service area of the web page.

The service and support information area 26, FIG. 5 features system service tags (SST) 26a which utilizes a five (5) digit system identifier located on a sticker with a bar code on each product. The SST can be entered and information specific to the user's system will be provided. When the SST is entered, an express service code (ESO) 26b which is a unique numeric code, is generated for a user when the user enters the SST at the web site. This will avoid call transfers and menu options so that the user is routed directly to a specialist at the provider site who will provide help with the user system. A file library 26c functions as a repository of downloads, BIOS updates drivers and utilities for the user system. This allows the user to keep their system up-to-date at their convenience. These files may be grouped by system, file type, name and date posted. An order status function 26d provides current status of individual or multiple orders. Provider staff members can retrieve order, production and ship dates directly from an internal order management system in real time.

Figure 6:
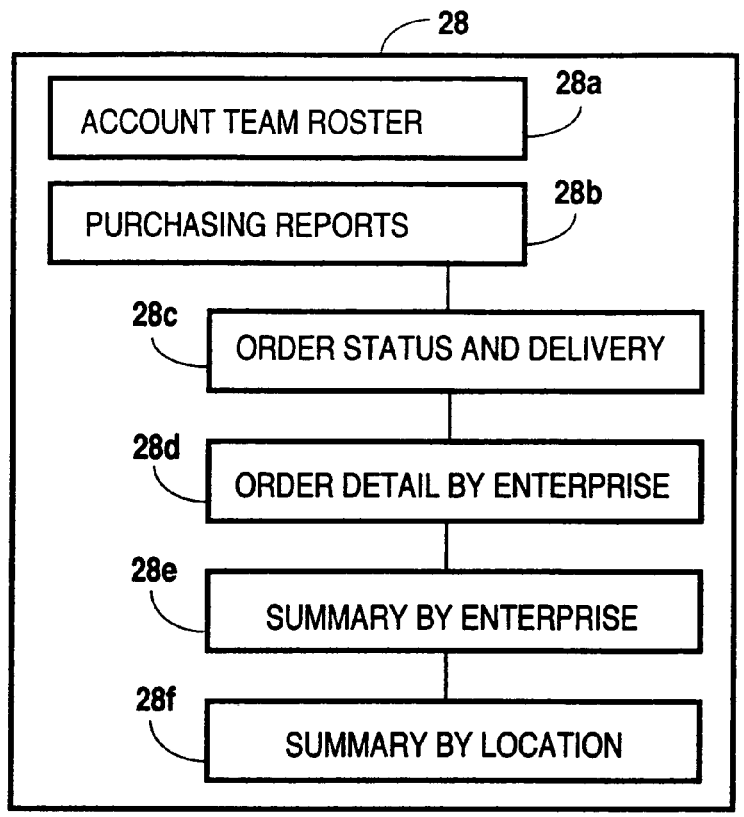
FIG. 6 is a diagrammatic view illustrating an embodiment of a secure area of the web page.

The secure area 28, FIG. 6 includes an account team roster 28a and purchasing reports 28b. The account team roster includes pager links and allows direct user contact with account team provider members. There are four (4) different purchasing reports which are provided and regularly updated.

Each report is viewable online or available for download in several formats. An order status and delivery report 28c shows the user detailed information on all orders from pending production status to invoiced status. An order detail by enterprise 28d report shows the detailed information on the units shipped and amount spent by product category for orders invoiced during a month. A summary by enterprise report 28e shows total units and spending by product category for the order invoiced during a month. Finally, a summary by location report 28f shows total units and spending by product category for each location in the user organization and includes only orders invoiced during a month.

The information area 30 includes links to the web site home and tips on how to use the web site as well as a feedback form to permit the user to submit ideas to the provider concerning how to improve the web site.

The browse area 32 provides easy access to the provider home page as well as to select links on the web site which may be of interest to the user.

Figure 7:
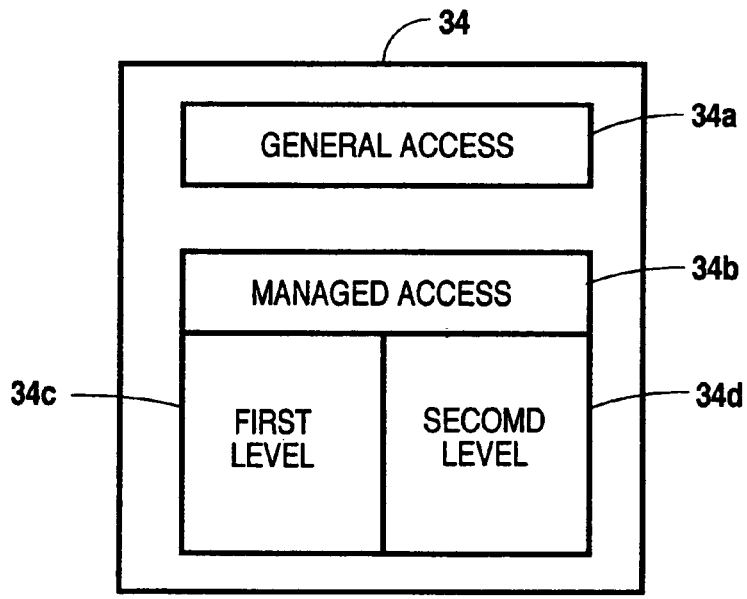
FIG. 7 is a diagrammatic view illustrating an embodiment of a multi-access area of the web page.

The multi-access area 34, FIG. 7 has at least two (2) levels of access, each of which is associated with the user ID and password mentioned above. One access area is referred to as a general access user ID and password area 34a and allows users to see everything at the web site except for the secure area 28. The other access area is referred to as a managed access user ID and password area 34b and allows users to see everything at the site including the secure area 28. The managed area may, if desired, be subdivided into multi-level access areas so that a first level managed access user ID and password allows users to see everything at the web site including a first portion 34c of the secure area 28 and a second level managed access user ID and password allows users to see everything at the web site including the first and a second portion 34c, 34d, respectively, of the secure area 28. Provider team members contact appropriate personnel at the user organization and provide the URL and multi-level ID's and passwords as required for user access to the web site 12. An intranet manager at the user organization can add a link from the second user point 16 to the web site 12 and post the general user ID and password next to the link for web site 12. This will permit anyone at the second user point 16 to access the web site 12 instead of having to recall a URL, user ID and password. The user organization will be responsible for designating appropriate people at the user organization to have the managed user ID and password usually reserved for a select group of users which may be defined by job description, rank, title, etc.

The online NDA 36 is provided each time a user visits web site 12 for the first time. After entering the URL for the organization web page 18, the user will be prompted to view and accept the online NDA 36. Once the NDA 36 is accepted, the user's hard drive at the terminal being used will function so as not to prompt that particular user with the NDA 36 again. However, each time a user accesses the organization web page 18 from a different terminal at second user point 16 for the first time, the user will be prompted to accept the NDA 36, and upon accepting, the terminal being used will function so as not to prompt that particular user with the NDA 36 again.

As it can be seen, the principal advantages of this embodiment are that the web site provides information which is continuously updated by the provider and makes business purchases easier to initiate, manage and control for both the organization user/buyer and the provider/seller and reduces purchasing and maintenance costs for both user and provider. In addition, direct relationships between user and provider are enhanced and supported from pre-sales to post-sales. The provider is able to off-load tasks such as order quoting and order status from the sales staff so that they can spend more time selling product. The user is encouraged to do more transactions and information gathering online which is more efficient. A competitive advantage to the provider is that the user can conduct business with the provider in an easier, more cost efficient manner. User satisfaction and loyalty is enhanced and new users are attracted to this mode of purchasing from the provider.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An information handling system, comprising:
a vendor-managed web site for:
receiving purchasing information from a first network point, including purchasing information that is customized for a customer, the customer including first and second users having respective first and second levels of authorized access to the purchasing information, the first user being identified by a first identifier, and the second user being identified by a second identifier; and
to a second network point, providing access to: only a first portion of the purchasing information in response to receiving the first identifier from the second network point which identifies the first user; and at least a second portion of the purchasing information in response to receiving the second identifier from the second network point which identifies the second user, wherein the second portion includes at least a part of the first portion and a third portion of the purchasing information, wherein the part of the first portion includes at least a portion of the customized purchasing information to assist the customer at the second network point in submitting an online order to the vendor-managed web site, and wherein the customized purchasing information includes status information related to the online order and includes a listing of configurations so that the customer at the second network point can submit the online order to the vendor-managed website in response to the configurations.

2. The system of claim 1, wherein the first portion includes the portion of the customized purchasing information.

3. The system of claim 1, wherein the first portion includes a first portion of the customized purchasing information, and wherein the third portion includes a second portion of the customized purchasing information.

4. The system of claim 1, wherein the vendor-managed web site is for providing access to the second network point via a URL.

5. The system of claim 4, wherein the URL is an unlisted URL.

6. The system of claim 1, wherein the status information includes shipping data.

7. The system of claim 1, wherein the vendor-managed web site is for outputting a notification to the second network point, so that the customer at the second network point is notified of a shipment of the online order.

8. The system of claim 1, wherein the vendor-managed web site is for providing access to the second network point, so that the customer at the second network point can enter an identifier for routing the customer to a specialist at the first network point.

9. The system of claim 1, wherein the customized purchasing information includes a listing of a team member at the first network point, so that the customer at the second network point can access the listing for making contact with the team member.

10. A method performed by an information system, the method comprising:
at a vendor-managed web site, receiving purchasing information from a first network point, including purchasing information that is customized for a customer, the customer including first and second users having respective first and second levels of authorized access to the purchasing information, the first user being identified by a first identifier, and the second user being identified by a second identifier; and
to a second network point, providing access at the vendor-managed web site to: only a first portion of the purchasing information in response to receiving the first identifier from the second network point which identifies the first user; and at least a second portion of the purchasing information in response to receiving the second identifier from the second network point which identifies the second user, wherein the second portion includes at least a part of the first portion and a third portion of the purchasing information, wherein the part of the first portion includes at least a portion of the customized purchasing information to assist the customer at the second network point in submitting an online order to the vendor-managed web site, and wherein the customized purchasing information includes status information related to the online order and includes a listing of configurations so that the customer at the second network point can submit the online order to the vendor-managed website in response to the configurations.

11. The method of claim 10, wherein the first portion includes the portion of the customized purchasing information.

12. The method of claim 10, wherein the first portion includes a first portion of the customized purchasing information, and wherein the third portion includes a second portion of the customized purchasing information.

13. The method of claim 10, wherein the providing access comprises:
providing access to the second network point via a URL.

14. The method of claim 13, wherein the URL is an unlisted URL.

15. The method of claim 10, wherein the customized purchasing information includes status information related to the online order.

16. The method of claim 15, wherein the status information includes shipping data.

17. The method of claim 10 and comprising:
outputting a notification to the second network point, so that the customer at the second network point is notified of a shipment of the online order.

18. The method of claim 10, wherein the providing access comprises:
providing access to the second network point, so that the customer at the second network point can enter an identifier for routing the customer to a specialist at the first network point.

19. The method of claim 10, wherein the customized purchasing information includes a listing of a team member at the first network point, so that the customer at the second network point can access the listing for making contact with the team member.

20. An information system, comprising:
a vendor-managed web site for:
receiving purchasing information from a first network point, including purchasing information that is customized for a customer, the customer including first and second users having respective first and second levels of authorized access to the purchasing information, the first user being identified by a first identifier, and the second user being identified by a second identifier; and
to a second network point, providing access to: only a first portion of the purchasing information in response to receiving the first identifier from the second network point which identifies the first user; and at least a second portion of the purchasing information in response to receiving the second identifier from the second network point which identifies the second user, wherein the second portion includes at least a part of the first portion and a third portion of the purchasing information, wherein the part of the first portion includes at least a portion of the customized purchasing information, and wherein the first identifier includes a first user identifier and a first password, and wherein the second identifier includes a second user identifier and a second password, and wherein the customized purchasing information includes status information related to an online order and includes a listing of configurations so that the customer at the second network point can submit the online order to the vendor-managed website in response to the configurations.

21. The system of claim 20, wherein the first portion includes the portion of the customized purchasing information.

22. The system of claim 20, wherein the first portion includes a first portion of the customized purchasing information, and wherein the third portion includes a second portion of the customized purchasing information.

23. The system of claim 20, wherein the vendor-managed web site is for providing access to the second network point via a URL.

24. The system of claim 23, wherein the URL is an unlisted URL.

25. The system of claim 20, wherein the status information includes shipping data.

26. The system of claim 20, wherein the vendor-managed web site is for outputting a notification to the second network point, so that the customer at the second network point is notified of a shipment of the online order.

27. The system of claim 20, wherein the vendor-managed web site is for providing access to the second network point, so that the customer at the second network point can enter an identifier for routing the customer to a specialist at the first network point.

28. The system of claim 20, wherein the customized purchasing information includes a listing of a team member at the first network point, so that the customer at the second network point can access the listing for making contact with the team member.

29. A method performed by an information system, the method comprising:
at a vendor-managed web site, receiving purchasing information from a first network point, including purchasing information that is customized for a customer, the customer including first and second users having respective first and second levels of authorized access to the purchasing information, the first user being identified by a first identifier, and the second user being identified by a second identifier; and to a second network point, providing access at the vendor-managed web site to: only a first portion of the purchasing information in response to receiving the first identifier from the second network point which identifies the first user; and at least a second portion of the purchasing information in response to receiving the second identifier from the second network point which identifies the second user, wherein the second portion includes at least a part of the first portion and a third portion of the purchasing information, wherein the part of the first portion includes at least a portion of the customized purchasing information, and wherein the first identifier includes a first user identifier and a first password, and wherein the second identifier includes a second user identifier and a second password, and wherein the customized purchasing information includes status information related to an online order and includes a listing of configurations so that the customer at the second network point can submit the online order to the vendor-managed website in response to the configurations.

30. The method of claim 29, wherein the first portion includes the portion of the customized purchasing information.

31. The method of claim 29, wherein the first portion includes a first portion of the customized purchasing information, and wherein the third portion includes a second portion of the customized purchasing information.

32. The method of claim 29, wherein the providing access comprises:
providing access to the second network point via a URL.

33. The method of claim 32, wherein the URL is an unlisted URL.

34. The method of claim 29, wherein the status information includes shipping data.

35. The method of claim 29, and comprising:
outputting a notification to the second network point, so that the customer at the second network point is notified of a shipment of the online order.

36. The method of claim 29, wherein the providing access comprises:
providing access to the second network point, so that the customer at the second network point can enter an identifier for routing the customer to a specialist at the first network point.

37. The method of claim 29, wherein the customized purchasing information includes a listing of a team member at the first network point, so that the customer at the second network point can access the listing for making contact with the team member.

* * * * *